(12) United States Patent
Xiang et al.

(10) Patent No.: US 11,457,126 B2
(45) Date of Patent: Sep. 27, 2022

(54) METHOD FOR DETECTING BLOCKING STATE OF IMAGE ACQUISITION DEVICE, ELECTRONIC DEVICE AND STORAGE MEDIUM

(71) Applicant: SHENZHEN SENSETIME TECHNOLOGY CO., LTD., Guangdong (CN)

(72) Inventors: Jie Xiang, Shenzhen (CN); Shaopeng Yin, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/242,455

(22) Filed: Apr. 28, 2021

(65) Prior Publication Data

US 2021/0250470 A1     Aug. 12, 2021

Related U.S. Application Data

(63) Continuation of application No. PCT/CN2019/122213, filed on Nov. 29, 2019.

(30) Foreign Application Priority Data

Jun. 28, 2019  (CN) .......................... 201910580603.6

(51) Int. Cl.
*H04N 5/235*     (2006.01)
*H04N 5/217*     (2011.01)
(Continued)

(52) U.S. Cl.
CPC ........... *H04N 5/2171* (2013.01); *B60R 11/04* (2013.01); *G06T 7/194* (2017.01); *G06T 7/62* (2017.01);
(Continued)

(58) Field of Classification Search
CPC .... H04N 5/2171; H04N 7/183; H04N 5/2351; H04N 5/2353; G06T 7/62; G06T 7/194;
(Continued)

(56) References Cited

U.S. PATENT DOCUMENTS 9,161,029 B1     10/2015  Kumar et al.
9,602,737 B2 *    3/2017  Hirooka ............... H04N 5/2353
(Continued)

FOREIGN PATENT DOCUMENTS

CN     105744268 A  *  7/2016
CN     105744268 A     7/2016
(Continued)

OTHER PUBLICATIONS

International Search Report in the international application No. PCT/CN2019/122213, dated Mar. 27, 2020.
(Continued)

*Primary Examiner* — Patrick E Demosky
(74) *Attorney, Agent, or Firm* — Syncoda LLC; Feng Ma

(57) ABSTRACT

A method for detecting a blocking state of an image acquisition device, an electronic device, and a computer storage medium are provided. The method includes: an image acquired by an image acquisition device is obtained; and it is determined, according to the acquired image, whether the image acquisition device is in a blocked state.

15 Claims, 2 Drawing Sheets

(51) Int. Cl.
  *G06T 7/62* (2017.01)
  *G06T 7/194* (2017.01)
  *B60R 11/04* (2006.01)
  *H04N 7/18* (2006.01)
(52) U.S. Cl.
  CPC .......... *H04N 7/183* (2013.01); *B60R 2300/10* (2013.01); *G06T 2207/10048* (2013.01)
(58) Field of Classification Search
  CPC ........... G06T 2207/10048; B60R 11/04; B60R 2300/10
  See application file for complete search history.

(56) References Cited

U.S. PATENT DOCUMENTS

2017/0036599 A1* 2/2017 Siddiqui ............ H04N 5/23293
2020/0278681 A1* 9/2020 Gier ........................ G06V 20/58
2020/0380269 A1* 12/2020 Mu ............................ G06T 7/70

FOREIGN PATENT DOCUMENTS

| CN | 107347151 A | 11/2017 |
| CN | 108710885 A | 10/2018 |
| JP | 2019029940 A | 2/2019 |

OTHER PUBLICATIONS

First Office Action of the Japanese application No. 2021-523700, dated May 24, 2022.

* cited by examiner

METHOD FOR DETECTING BLOCKING STATE OF IMAGE ACQUISITION DEVICE, ELECTRONIC DEVICE AND STORAGE MEDIUM

CROSS-REFERENCE TO RELATED APPLICATION

The present application is a continuation application of an International Patent Application No. PCT/CN 2019/122213 filed on Nov. 29, 2019, which claims priority to Chinese Patent Application No. 201910580603.6, filed to the Chinese Patent Office on Jun. 28, 2019 and entitled "METHOD AND APPARATUS FOR DETECTING BLOCKING STATE OF IMAGE ACQUISITION DEVICE, DEVICE AND STORAGE MEDIUM". The disclosures of both applications are incorporated herein by reference in their entirety.

BACKGROUND

In the related art, cameras are widely used in various scenarios, such as in security monitoring, in image acquisition, and in monitoring of fatigue driving and dangerous driving behaviors. However, if a camera is blocked, the provision of the camera is meaningless because no meaningful image can be captured.

SUMMARY

The present disclosure relates to the field of driving monitoring, in particular, to a method and apparatus for detecting a blocking state of an image acquisition device, an electronic device, and a computer storage medium.

In a first aspect, the embodiments of the present disclosure provide a method for detecting a blocking state of an image acquisition device. The method includes:

obtaining an image acquired by an image acquisition device; and determining, according to the acquired image, whether the image acquisition device is in a blocked state.

In a second aspect, the embodiments of the present disclosure further provide an apparatus for detecting a blocking state of an image acquisition device. The apparatus includes an obtaining module and a first processing module, where the obtaining module is configured to obtain an image acquired by an image acquisition device; and the first processing module is configured to determine, according to the acquired image, whether the image acquisition device is in a blocked state.

In a third aspect, the embodiments of the present disclosure further provide an electronic device, including a processor and a memory configured to store a computer program that, when executed by the processor, causes the processor to perform the following operations including:

obtaining an image acquired by an image acquisition device; and determining, according to the acquired image, whether the image acquisition device is in a blocked state.

In a fourth aspect, the embodiments of the present disclosure further provide a non-transitory computer-readable storage medium, having stored thereon a computer program stored that, when executed by a processor, causes the processor to perform a method for detecting a blocking state of an image acquisition device, the method including:

obtaining an image acquired by an image acquisition device; and determining, according to the acquired image, whether the image acquisition device is in a blocked state.

In a fifth aspect, the embodiments of the present disclosure further provide a computer program product, where the computer program product includes computer executable instructions that, when executed, to perform a method for detecting a blocking state of an image acquisition device, the method including:

obtaining an image acquired by an image acquisition device; and determining, according to the acquired image, whether the image acquisition device is in a blocked state.

It should be understood that the foregoing general descriptions and the following detailed descriptions are merely exemplary and explanatory, and are not intended to limit the present disclosure.

BRIEF DESCRIPTION OF THE DRAWINGS

The accompanying drawings herein are incorporated into the description and constitute a part of the description. These accompanying drawings show embodiments that conform to the present disclosure, and are intended to describe the technical solutions in the present disclosure together with the description.

DETAILED DESCRIPTION

Figure 1:
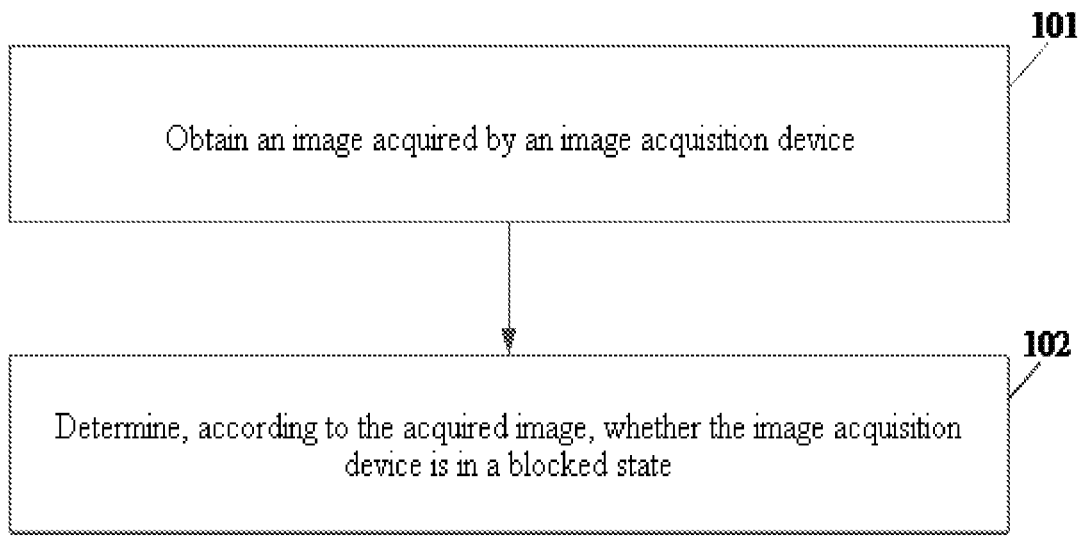
FIG. 1 is a flowchart of a method for detecting a blocking state of an image acquisition device according to embodiments of the present disclosure.

The present disclosure is further described in detail below with reference to the accompanying drawings and embodiments. It should be understood that the embodiments provided herein are merely intended to explain the present disclosure, rather than limit the present disclosure. In addition, the embodiments provided below are some embodiments for implementing the present disclosure, but not all the embodiments for implementing the present disclosure. The technical solutions described in the embodiments of the present disclosure can be implemented in any combination form in the case of no conflicts.

It should be noted that in the embodiments of the present disclosure, the terms "comprise", "include", or any other variant thereof aim at covering non-exclusive "including", so that the method or apparatus comprising a series of elements not only includes the elements that are explicitly recited, but also includes other elements that are not explicitly listed, or also includes the elements inherent to the implementation of the method or the apparatus. If no more limitations are made, an element defined by a phrase "including one . . . " does not exclude that there are other relevant elements in the method or apparatus including the element (for example, steps in the method or units in the apparatus; the units may be a part of a circuit, a part of a processor, a part of a program or software, etc.).

The term "and/or" herein only describes an association relationship between associated objects and indicates that three relationships may exist. For example, A and/or B may indicate three conditions, i.e., A exists separately, A and B exist at the same time, and B exists separately. In addition, the term "at least one" herein indicates any one of multiple elements or any combination of at least two of multiple elements. For example, including at least one of A, B, or C may indicate including any one or more elements selected from a set consisting of A, B, and C.

For example, the method for detecting a blocking state of an image acquisition device provided in the embodiments of the present disclosure includes a series of steps, but is not limited to the described steps. Similarly, the apparatus for detecting a blocking state of an image acquisition device provided in the embodiments of the present disclosure includes a series of modules, but is not limited to the explicitly described modules, and may further include modules configured to obtain relevant information or provided based on requirements during performing processing on information.

The embodiments of the present disclosure may be applied to a terminal, which may operate with numerous other general-purpose or special-purpose computing system environments or configurations. Here, the terminal may be a vehicle-mounted terminal, a thin client, a thick client, a handheld or laptop device, a microprocessor-based system, a set top box, a programmable consumer electronic product, a network personal computer, a small computer system, and the like.

Electronic devices such as terminals may be described in the general context of computer system executable instructions (for example, program modules) executed by computer systems. Generally, the program modules may include routines, programs, target programs, components, logics, data structures, and the like for performing specific tasks or implementing specific abstract data types. The computer systems/servers may be practiced in distributed cloud computing environments in which tasks are performed by remote processing devices that are linked through a communications network. In the distributed computing environments, the program modules may be located in local or remote computing system storage media including storage devices.

Based on the content described above, in some of the embodiments of the present disclosure, a method and apparatus for detecting a blocking state of an image acquisition device are provided.

FIG. 1 is a flowchart of a method for detecting a blocking state of an image acquisition device according to embodiments of the present disclosure. As shown in FIG. 1, the flow may include the following steps.

At step 101, an image acquired by an image acquisition device is obtained.

Here, the image acquisition device may be a camera. Optionally, the image acquisition device is an infrared camera, and thus may acquire image data at night or in other dark conditions.

At step 102, whether the image acquisition device is in a blocked state is determined according to the acquired image.

Here, the image acquisition device being blocked means that more than 75% of the field of view of the image acquisition device is blocked by an opaque material.

Exemplarily, whether the image device is blocked may be determined according to feature information of the image acquired by the image acquisition device.

As one implementation, the feature information of the acquired image may include at least one of the following: average brightness, a ratio of a foreground area to an effective area, or the number of outlines in the image. Here, the average brightness of the image represents the average brightness of the entire image; the foreground area of the image represents the area of a foreground portion of the image recognized from the acquired image; the effective area of the image is predetermined and is less than or equal to the area of the acquired image; and the number of outlines in the image is the number of target outlines obtained by performing target recognition on the acquired image.

In practical application, a foreground portion and a background portion of an image may be separated by using multiple methods. Exemplarily, a foreground portion and a background portion of an image are separated by using a dynamic threshold segmentation method. In the process of separating a foreground portion and a background portion of an image by using the dynamic threshold segmentation method, specifically, different gray thresholds may be set for different regions of the image; and for pixel points in the image, by comparing a gray value of each pixel point and a corresponding gray threshold, whether the pixel point is a foreground point or a background point may be determined; and thus, the foreground portion and the background portion of the image may be determined.

In practical application, target detection and recognition may be performed on the image by using an outline detection method to obtain target outlines, so that the number of target outlines may be determined. In the embodiments of the present disclosure, no limitation is made to the outline detection method.

Optionally, the effective area of the acquired image may be predetermined according to relative positions of the image acquisition device and a fill light, and the fill light is configured to supplement light for a region on which image acquisition is performed by the image acquisition device. If the image acquisition device is an infrared camera, the fill light is an infrared fill light. In a specific example, if fill lights are uniformly distributed around a camera of the image acquisition device, i.e., supplemental light is uniformly distributed on the entire image acquired, the effective area of the image may be the area of the entire image acquired; and if supplemental light is mainly distributed at the center of the acquired image, the effective area may be determined to be the area of a circle having a diameter which equals to a short side of the acquired image.

In practical application, after acquiring an image, the image acquisition device may transmit the acquired image to a device such as a processor to perform further processing. The image acquisition device may acquire images in real time to obtain multiple images that are continuously acquired. For example, the image acquisition device may acquire an image every N seconds, where N may be predetermined.

In practical application, steps 101 and 102 may be implemented based on a processor or the like in an apparatus for detecting a blocking state of an image acquisition device. The processor may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, or a microprocessor. It can be understood that for different apparatuses for detecting a blocking state of an image acquisition device, there may also be other electronic devices configured to implement the function of the processor, and no specific limitation is made thereto in the embodiments of the present disclosure.

In this way, in the embodiments of the present disclosure, whether an image acquisition device is blocked may be determined according to an image acquired by the image acquisition device, thus facilitating the implementation of blocking determination, so that whether the image acquisition device is blocked can be found out in time, so as to facilitate determining whether the acquired image is valuable for use and to facilitate application of the acquired image in a specific scenario.

In practical application, a face image may be extracted from the acquired image by using a face recognition technology. No limitation is made to the type of the face recognition technology in the embodiments of the present disclosure, for example, a face recognition technology based on deep learning is adopted.

For the implementation of determining, according to the image acquired by the image acquisition device, whether the image acquisition device is in the blocked state, exemplarily, the average brightness of the acquired image may be determined according to the acquired image; if a duration in which the average brightness of the acquired image is less than a first brightness threshold is greater than or equal to a second set duration, or if a duration in which the average brightness of the acquired image is greater than a second brightness threshold is greater than or equal to the second set duration, it may be determined that the image acquisition device is in the blocked state; and here, the first brightness threshold is less than the second brightness threshold.

Optionally, if it is determined that the average brightness of the acquired image is greater than or equal to the first brightness threshold, and is less than or equal to the second brightness threshold, the ratio of the foreground area to the effective area of the acquired image may be determined; and if a duration in which the ratio of the foreground area to the effective area of the acquired image is greater than a set value is greater than or equal to a third set duration, it may be determined that the image acquisition device is in the blocked state.

In a specific example, it is defined that if a blocked area (the foreground area) is greater than the effective area of the entire image by more than 75%, it is considered that the image acquisition device (such as an infrared camera) is blocked.

Optionally, if it is determined that the average brightness of the acquired image is greater than or equal to the first brightness threshold, and is less than or equal to the second brightness threshold, and it is determined that the ratio of the foreground area to the effective area of the acquired image is less than or equal to the set value, the number of outlines in the acquired image may be determined; if a duration in which the number of outlines in the acquired image is less than a set number is greater than or equal to a fourth set duration, it may be determined that the image acquisition device is in the blocked state; and if the number of outlines in the acquired image is greater than or equal to the set number, it may be determined that the image acquisition device is in an unblocked state.

In the embodiments of the present disclosure, the first brightness threshold, the second brightness threshold, the set value, and the set number may all be predetermined according to an actual application scenario. For example, the range of the set value is from 65% to 85%, and the range of the set number is from 8 to 12. The second set duration, the third set duration, and the fourth set duration may all be predetermined according to an actual application scenario; any two of the second set duration, the third set duration, and the fourth set duration may be the same or different; and in one example, the ranges of the second set duration, the third set duration, and the fourth set duration are all from 4 to 7 seconds.

Furthermore, from the moment when it is determined that the image acquisition device is not blocked, timing is started to obtain a duration in which the image acquisition device is blocked; whether the duration in which the image acquisition device is blocked exceeds a fifth set duration (i.e., greater than or equal to the fifth set duration) is determined; if the duration in which the image acquisition device is blocked exceeds the fifth set duration, alarming information may be issued; if the duration in which the image acquisition device is blocked does not exceed the fifth set duration, timing may be continued so as to continue to obtain the duration in which the image acquisition device is blocked.

Here, the fifth set duration may be predetermined according to an actual application scenario; and the fifth set duration may be the same as or different from the first set duration. For example, the fifth set duration is 5 seconds. The form of the alarming information includes, but is not limited to: sound alarming information, light-emitting alarming information, vibration alarming information, or the like.

Furthermore, after issuing the alarming information, if it is determined that the image acquisition device is in the unblocked state, the issuing of the alarming information may be stopped. In this way, whether to issue the alarming information may be flexibly decided according to whether the image acquisition device is blocked, thereby better satisfying actual requirements.

Furthermore, after issuing the alarming information, the alarming information may be locally stored to facilitate subsequent query; and after issuing the alarming information, the alarming information may also be uploaded to a cloud to facilitate notifying a remote monitoring person.

In practical application, if the image acquisition device is an infrared camera, characteristics of the infrared camera need to be considered; if the infrared fill light is completely blocked by an adhesive tape or the like, in this case, the foreground area is not necessarily greater than 75%, and whether the infrared camera is blocked needs to be determined by means of the average brightness of the image. For example, whether the average brightness of the image is less than the first brightness threshold is determined; if the average brightness of the image is less than the first brightness threshold or is greater than the second brightness threshold, timing is started, and if the duration reaches 5 seconds, it is considered that the infrared camera is blocked; if the average brightness of the image is greater than or equal to the first brightness threshold and is less than or equal to the second brightness threshold, segmentation of the foreground portion and the background portion of the image is started according to the dynamic threshold segmentation method; if the foreground area is greater than 75% of the effective area, timing is started, and if the duration reaches 5 seconds, it is considered that the infrared camera is blocked; if the foreground area is not greater than 75% of the effective area, the number of outlines in the image is obtained by outline detection; if the number of outlines is less than 10 and the duration reaches 5 seconds, it is considered that the infrared camera is blocked; and if the number of outlines is not less than 10, it may be considered that the infrared camera is not blocked.

As an implementation, if it is detected that the infrared camera is blocked and the duration exceeds the fifth set duration, alarming information may be issued. For example, the alarming information is an audio alarm with the content "please do not block the camera".

In the embodiments of the present disclosure, the image acquisition device may be a vehicle-mounted image acquisition device, a household image acquisition device or the like. An implementation of the method for detecting a blocking state of an image acquisition device is described below by taking the image acquisition device being a vehicle-mounted image acquisition device as an example.

Figure 2:
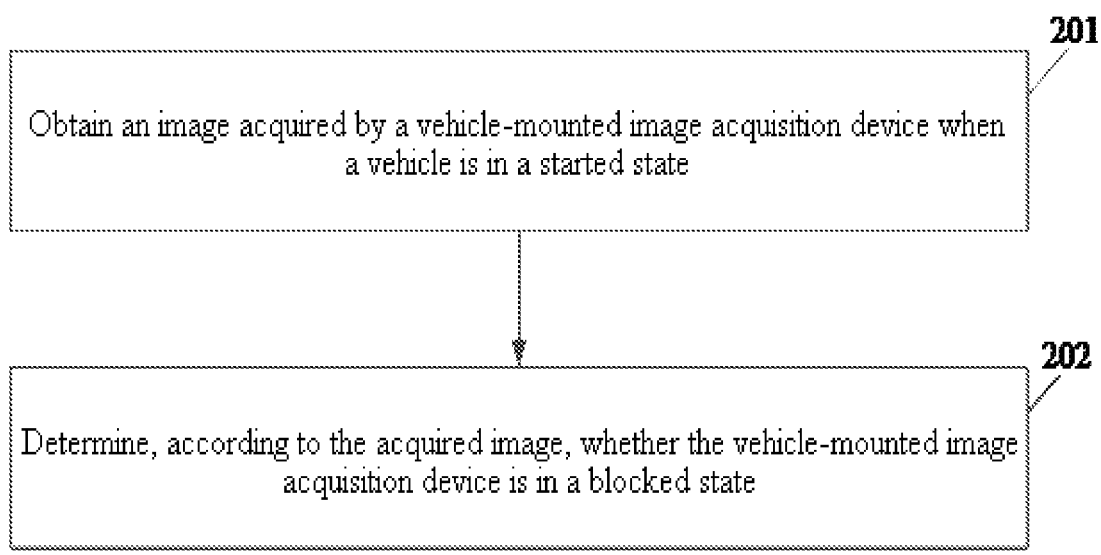
FIG. 2 is a flowchart of a method for detecting a blocking state of a vehicle-mounted image acquisition device according to embodiments of the present disclosure.

FIG. 2 is a flowchart of a method for detecting a blocking state of a vehicle-mounted image acquisition device according to embodiments of the present disclosure. As shown in FIG. 2, the flow may include the following steps.

At step 201, an image acquired by a vehicle-mounted image acquisition device when the vehicle is in a started state is obtained.

Here, the vehicle-mounted image acquisition device may be a camera. Optionally, the vehicle-mounted image acquisition device is an infrared camera, and thus may acquire image data in the vehicle at night or in other dark conditions. In practical application, the vehicle-mounted image acquisition device may be mounted to face a driving position region, so that when there is a person at the driving position, an image of the person at the driving position may be captured.

The vehicle being in the started state refers to a state in which the vehicle is started and a state after the vehicle is started and before the vehicle engine is off.

Exemplarily, the vehicle being in the started state includes that the traveling speed of the vehicle is greater than a set speed, where the set speed may be set according to actual requirements. For example, the set speed is 1 km/h or other speed value.

At step 202, whether the vehicle-mounted image acquisition device is in a blocked state is determined according to the acquired image.

Here, the vehicle-mounted image acquisition device being blocked means that more than 75% of the field of view of the vehicle-mounted image acquisition device is blocked by an opaque material.

Exemplarily, according to feature information of the image acquired by the vehicle-mounted image acquisition device, whether the vehicle-mounted image device is blocked may be determined.

As one implementation, the feature information of the acquired image may include at least one of the following: average brightness, a ratio of a foreground area to an effective area, or the number of outlines in the image. Here, the average brightness of the image represents the average brightness of the entire image; the foreground area of the image represents the area of a foreground portion of the image recognized from the acquired image; the effective area of the image is predetermined and is less than or equal to the area of the acquired image; and the number of outlines in the image is the number of target outlines obtained by performing target recognition on the acquired image.

In practical application, a foreground portion and a background portion of an image may be separated by using multiple methods. Exemplarily, a foreground portion and a background portion of an image are separated by using a dynamic threshold segmentation method. In the process of separating a foreground portion and a background portion of an image by using the dynamic threshold segmentation method, specifically, different gray thresholds may be set for different regions of the image; and for pixel points in the image, by comparing a gray value of each pixel point and a corresponding gray threshold, whether the pixel point is a foreground point or a background point may be determined; and thus, the foreground portion and the background portion of the image may be determined.

In practical application, target detection and recognition may be performed on the image by using an outline detection method to obtain target outlines, and thus, the number of target outlines may be determined. For example, after performing outline detection on the image, 5 target outlines of a vehicle seat, a human body, etc. may be obtained, and the number of outlines in the image is 5. No limitation is made to the outline detection method in the embodiments of the present disclosure.

Optionally, the effective area of the acquired image may be predetermined according to relative positions of the vehicle-mounted image acquisition device and a fill light, and the fill light is configured to supplement light for a region on which image acquisition is performed by the vehicle-mounted image acquisition device. If the vehicle-mounted image acquisition device is an infrared camera, the fill light is an infrared fill light. In a specific example, if fill lights are uniformly distributed around a camera of the vehicle-mounted image acquisition device, i.e., supplemental light is uniformly distributed on the entire image acquired, the effective area of the image may be the area of the entire image acquired; and if supplemental light is mainly distributed at the center of the acquired image, the effective area may be determined to be the area of a circle having a diameter which equals to a short side of the acquired image.

In practical application, after acquiring an image, the vehicle-mounted image acquisition device may transmit the acquired image to a device such as a processor to perform further processing. The vehicle-mounted image acquisition device may acquire images in real time to obtain multiple images that are continuously acquired. For example, the vehicle-mounted image acquisition device may acquire an image every N seconds, where N may be predetermined.

In practical application, steps 201 and 202 may be implemented based on a processor or the like in an apparatus for detecting a blocking state of an vehicle-mounted image acquisition device, and the processor may be at least one of an ASIC, a DSP, a DSPD, a PLD, an FPGA, a CPU, a controller, a microcontroller, or a microprocessor. It can be understood that for different apparatuses for detecting a blocking state of a vehicle-mounted image acquisition device, there may also be other electronic devices configured to implement the function of the processor, and no specific limitation is made thereto in the embodiments of the present disclosure.

In this way, in the embodiments of the present disclosure, whether a vehicle-mounted image acquisition device is blocked may be directly determined according to an image acquired by the vehicle-mounted image acquisition device when the vehicle is in a started state, thus facilitating the implementation, and furthermore, facilitating determining a driving behavior according to a blocking determination result. For example, if it is determined that the vehicle-mounted image acquisition device is not blocked, the driving behavior may be detected based on the acquired image, so as to facilitate improving the security of driving.

Optionally, a face image may be extracted from the image acquired by the vehicle-mounted image acquisition device when the vehicle is in the started state, and the vehicle-mounted image acquisition device is mounted on the vehicle and is configured to at least acquire an image of the driving position region of the vehicle.

In practical application, a face image may be extracted from the acquired image by using a face recognition technology. No limitation is made to the type of the face recognition technology in the embodiments of the present disclosure, for example, a face recognition technology based on deep learning is adopted.

Optionally, in response to a case that no face image is extracted from the acquired image, it is determined that a driver is off duty.

In the embodiments of the present disclosure, the driver being off duty indicates a state in which a predetermined driver is not at the driving position or there is no person at the driving position. If no face image is extracted from the acquired image, it may be directly determined that there is no person at the driving position, and thus, it may be determined that the driver is off duty.

During actual use of a driver monitoring system, for the reasons such as dislike of being monitored, some drivers may block a monitoring camera by using some objects such as clothes, a paper cup, and an adhesive tape, rendering the monitoring system unavailable, and thus, on-duty states of the drivers cannot be accurately determined.

Moreover, in the embodiments of the present disclosure, after determining that the vehicle-mounted image acquisition device is not blocked, the on-duty state of the driver may be determined by determining whether the image acquired by the vehicle-mounted image acquisition device includes a face image. Therefore, the influence on the on-duty state detection of the driver caused by the blocking of the vehicle-mounted image acquisition device can be avoided, and the accuracy and reliability of the on-duty state detection of the driver can be improved.

Further, if a face image is extracted from the acquired image, whether features of the face image extracted from the image match features of a pre-stored face image of the driver may be determined; and in response to the case that the features of the face image extracted from the acquired image do not match the features of the pre-stored face image of the driver, it may be determined that the driver is off duty.

Optionally, in response to the case that the features of the face image extracted from the acquired image match the features of the pre-stored face image of the driver, it may be determined that the driver is on duty.

In practical application, a face image of a driver may be pre-stored by means of driver registration.

Optionally, a face image of a driver may be pre-stored by using the following steps: after authentication succeeds on a mobile terminal, uploading a face image of the driver to a cloud server by means of the mobile terminal and storing the face image in the cloud server; and after the face image of the driver related to the vehicle stored in the cloud server is updated, transmitting, by the cloud server, to the vehicle the updated face image of the driver related to the vehicle after a connection is established between the vehicle and the cloud server. Specifically, the driver may be registered on the cloud server by means of an application (APP) installed on the mobile terminal, and when performing driver registration by means of the mobile terminal, a face image of the driver is uploaded to the cloud server by means of the mobile terminal. Here, driver registration may be performed on the cloud server when the vehicle is not started; or driver registration may be performed on the cloud server when the vehicle is started but does not move.

Optionally, a face image of the driver is pre-stored by the following steps: if the vehicle is started but does not move, after authentication succeeds, acquiring a face image of the driver by means of the vehicle-mounted image acquisition device and storing same.

In the embodiments of the present disclosure, by determining whether the face image in the acquired image matches the pre-stored face image of the driver, whether the driver is off duty or on duty can be accurately detected. By detecting matching of the face image, if an unrelated person or a person having no driving qualification appears at the driving position, the unsafety of the vehicle or unsafe driving caused by only detecting whether there is a person at the driving position is avoided. It can be seen that in the embodiments of the present disclosure, a face image of a driver who should be on duty may be obtained in advance, and the on-duty state of the driver who should be on duty is determined by determining whether the current extracted face image matches the pre-stored face image of the driver who should be on duty, thereby further improving driving safety.

In the embodiments of the present disclosure, said face image in the foregoing acquired image may include one face image and may also include a plurality of face images; if there are a plurality of face images in the acquired image, for each face image in the foregoing acquired image, an image region of each face image may be determined; for example, one face image in the foregoing acquired image is located in a driving position region in the acquired image, and may also be located at a non-driving position region in the acquired image; and the driving position region in the image may be predetermined, for example, the driving position region in the image is the left half portion of the image.

As one implementation, if a plurality of face images are extracted from the acquired image, a face image in the driving position region in the acquired image may be selected from the plurality of face images; and in response to the case that the features of the selected face image do not match the features of the pre-stored face image of the driver, it is determined that the driver is off duty.

Optionally, in response to the case that the features of the selected face image match the features of the pre-stored face image of the driver, it is determined that the driver is on duty.

It can be seen that in the embodiments of the present disclosure, for a selected face image in the driving position region in the image, feature matching of the face image may be determined subsequently, so that whether the person currently appearing in the driving position region is the driver who should be on duty can be determined, and thus, the accuracy of on-duty state detection of the driver is further improved.

As one implementation, by determining in real time whether the features of the face image in the acquired image match the features of the pre-stored face image of the driver, a duration in which the driver is continuously off duty may be determined.

That is to say, for each of multiple frames of images that are continuously acquired, whether the features of the face image therein match the features of the pre-stored face image of the driver may be determined; when results of a plurality of continuous determinations all indicate mismatching, the duration in which the driver is off duty may be determined according to a duration for acquiring the multiple frames of images; for example, for multiple frames of images acquired within 1 minute, if the determination results all indicate mismatching, it may be determined that the duration in which the driver is continuously off duty is at least 1 minute.

Furthermore, whether the duration in which the driver is continuously off duty exceeds a first set duration may be determined; if the duration in which the driver is continuously off duty exceeds the first set duration (i.e., being greater than or equal to the first set duration), first alarming information may be issued; and if the duration in which the driver is continuously off duty does not exceed the first set duration, calculation of the duration in which the driver is continuously off duty may be continued.

Here, the first set duration may be predetermined according to an actual application scenario; for example, the first set duration is 2 seconds. The form of the first warning information includes, but is not limited to: sound warning information, light-emitting warning information, vibration warning information, or the like.

Furthermore, after issuing the first alarming information, if it is determined that the driver is on duty, the issuing of the first alarming information may be stopped. In this way, flexible processing may be performed on the first alarming information according to a change in the on-duty state of the driver, so as to better satisfy actual requirements.

Furthermore, after issuing the first alarming information, the first alarming information may be locally stored to facilitate subsequent query; and after issuing the first alarming information, the first alarming information may also be uploaded to a cloud to facilitate notifying a remote monitoring person.

Optionally, the image acquired by the vehicle-mounted image acquisition device when the driver is in an off-duty state may also be locally stored or uploaded to the cloud to facilitate subsequent analysis.

For the implementation of determining, according to the image acquired by the vehicle-mounted image acquisition device when the vehicle is in the started state, whether the vehicle-mounted image acquisition device is in the blocked state, exemplarily, the average brightness of the acquired image may be determined according to the acquired image; if a duration in which the average brightness of the acquired image is less than a first brightness threshold is greater than or equal to a second set duration, or if a duration in which the average brightness of the acquired image is greater than a second brightness threshold is greater than or equal to the second set duration, it may be determined that the vehicle-mounted image acquisition device is in the blocked state; here, the first brightness threshold is less than the second brightness threshold.

Optionally, if it is determined that the average brightness of the acquired image is greater than or equal to the first brightness threshold, and is less than or equal to the second brightness threshold, the ratio of the foreground area to the effective area of the acquired image may be determined; and if a duration in which the ratio of the foreground area to the effective area of the acquired image is greater than a set value is greater than or equal to a third set duration, it may be determined that the vehicle-mounted image acquisition device is in the blocked state.

In a specific example, it is defined that if a blocked area (the foreground area) is greater than the effective area of the entire image by more than 75%, it is considered that the vehicle-mounted image acquisition device (such as an infrared camera) is blocked.

Optionally, if it is determined that the average brightness of the acquired image is greater than or equal to the first brightness threshold, and is less than or equal to the second brightness threshold, and it is determined that the ratio of the foreground area to the effective area of the acquired image is less than or equal to the set value, the number of outlines in the acquired image may be determined; if a duration in which the number of outlines in the acquired image is less than a set number is greater than or equal to a fourth set duration, it may be determined that the vehicle-mounted image acquisition device is in the blocked state; and if the number of outlines in the acquired image is greater than or equal to the set number, it may be determined that the vehicle-mounted image acquisition device is in an unblocked state.

In the embodiments of the present disclosure, the first brightness threshold, the second brightness threshold, the set value, and the set number may all be predetermined according to an actual application scenario. For example, the range of the set value is from 65% to 85%, and the range of the set number is from 8 to 12; and the second set duration, the third set duration, and the fourth set duration may all be predetermined according to an actual application scenario, and any two of the second set duration, the third set duration, and the fourth set duration may be the same or different. In one example, the ranges of the second set duration, the third set duration, and the fourth set duration are all from 4 to 7 seconds.

Furthermore, from the moment when it is determined that the vehicle-mounted image acquisition device is not blocked, timing is started to obtain a duration in which the vehicle-mounted image acquisition device is blocked; whether the duration in which the vehicle-mounted image acquisition device is blocked exceeds a fifth set duration (i.e., being greater than or equal to the fifth set duration) is determined; if the duration in which the vehicle-mounted image acquisition device is blocked exceeds the fifth set duration, second alarming information may be issued; and if the duration in which the vehicle-mounted image acquisition device is blocked does not exceed the fifth set duration, timing may be continued so as to continue to obtain the duration in which the vehicle-mounted image acquisition device is blocked.

Here, the fifth set duration may be predetermined according to an actual application scenario; and the fifth set duration may be the same as or different from the first set duration. For example, the fifth set duration is 5 seconds. The form of the second alarming information includes, but is not limited to: sound alarming information, light-emitting alarming information, vibration alarming information, or the like.

Furthermore, after issuing the second alarming information, if it is determined that the vehicle-mounted image acquisition device is in the unblocked state, the issuing of the second alarming information may be stopped, so that whether to issue the second alarming information can be flexibly decided according to whether the vehicle-mounted image acquisition device is blocked, thereby better satisfying actual requirements.

Furthermore, after issuing the second alarming information, the second alarming information may be locally stored to facilitate subsequent query; and after issuing the second alarming information, the second alarming information may also be uploaded to a cloud to facilitate notifying a remote monitoring person.

In practical application, if the image acquisition device is an infrared camera, characteristics of the infrared camera need to be considered; if the driver completely blocks an infrared fill light by means of an adhesive tape or the like, in this case, the foreground area is not necessarily greater than 75%, and whether the infrared camera is blocked needs to be determined by means of the average brightness of the image. For example, whether the average brightness of the image is less than the first brightness threshold is determined; if the average brightness of the image is less than the first brightness threshold or greater than the second brightness threshold, timing is started, and if the duration reaches 5 seconds, it is considered that the infrared camera is blocked; if the average brightness of the image is greater than the first brightness threshold and is less than the second brightness threshold, segmentation of the foreground portion and the background portion of the image is started according to the dynamic threshold segmentation method; if the foreground area is greater than 75% of the effective area, timing is started, and if the duration reaches 5 seconds, it is considered that the infrared camera is blocked; if the foreground area is not greater than 75% of the effective area, the number of outlines in the image is obtained by means of outline detection; if the number of outlines is less than 10 and the duration reaches 5 seconds, it is considered that the infrared camera is blocked; and if the number of outlines is not less than 10, it may be considered that the infrared camera is not blocked.

As one implementation, if it is detected that the infrared camera is blocked and the duration exceeds the fifth set duration, the second alarming information may be issued. For example, the second alarming information is an audio alarming with the content "please do not block the camera". If it is detected that the driver is off duty and the duration in which the driver is continuously off duty exceeds the first set duration, the first alarming information may be issued. For example, the first alarming information is an audio alarming with the content "please return to the driving position".

A person skilled in the art can understand that, in the foregoing method in the detailed description, the order in which the steps are written does not imply a strict execution order which constitutes any limitation to the implementation process, and the specific order of executing the steps should be determined by functions and possible internal logics thereof.

Based on the method for detecting a blocking state of an image acquisition device provided by the foregoing embodiments, the embodiments of the present disclosure provide an apparatus for detecting a blocking state of an image acquisition device.

Figure 3:
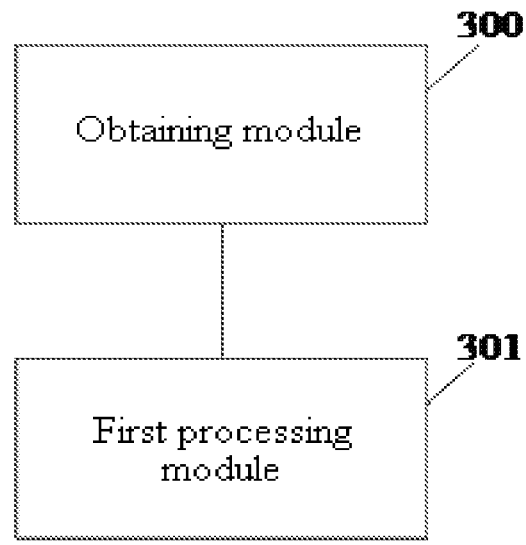
FIG. 3 is a schematic structural composition diagram of an apparatus for detecting a blocking state of an image acquisition device according to embodiments of the present disclosure.

FIG. 3 is a schematic structural composition diagram of an apparatus for detecting a blocking state of an image acquisition device according to embodiments of the present disclosure. As shown in FIG. 3, the apparatus includes an obtaining module 300 and a first processing module 301, where the obtaining module 300 is configured to obtain an image acquired by an image acquisition device; and the first processing module 301 is configured to determine, according to the acquired image, whether the image acquisition device is in a blocked state.

In one implementation, the first processing module 301 being configured to determine, according to the acquired image, whether the image acquisition device is in the blocked state includes:

determining average brightness of the image according to the acquired image; and in response to a duration in which the average brightness of the image is less than a first brightness threshold being greater than or equal to a second set duration, or a duration in which the average brightness of the image is greater than a second brightness threshold being greater than or equal to the second set duration, determining that the image acquisition device is in the blocked state, where the first brightness threshold is less than the second brightness threshold.

In one implementation, the first processing module 301 being configured to determine, according to the acquired image, whether the image acquisition device is in the blocked state further includes:

determining that the average brightness of the acquired image is greater than or equal to a first brightness threshold, and is less than a second brightness threshold, where the first brightness threshold is less than the second brightness threshold; and in response to a duration in which a ratio of a foreground area to an effective area of the acquired image is greater than a set value being greater than or equal to a third set duration, determining that the image acquisition device is in the blocked state, where the foreground area represents the area of a foreground portion of the image recognized from the acquired image, and the effective area is predetermined and is less than or equal to the area of the acquired image.

In one implementation, the first processing module 301 being configured to determine, according to the acquired image, whether the image acquisition device is in the blocked state further includes:

determining that the average brightness of the acquired image is greater than or equal to a first brightness threshold, and is less than or equal to a second brightness threshold, where the first brightness threshold is less than the second brightness threshold;

determining that a ratio of a foreground area to an effective area of the acquired image is less than or equal to a set value, where the foreground area represents the area of a foreground portion of the image recognized from the acquired image, and the effective area is predetermined and is less than or equal to the area of the acquired image; and in response to a duration in which the number of outlines in the acquired image is less than a set number being greater than or equal to a fourth set duration, determining that the image acquisition device is in the blocked state, where the number of outlines is the number of target outlines obtained by performing outline detection on the acquired image.

In one implementation, the first processing module 301 being configured to determine, according to the acquired image, whether the image acquisition device is in the blocked state further includes:

determining that the average brightness of the acquired image is greater than or equal to a first brightness threshold, and is less than or equal to a second brightness threshold, where the first brightness threshold is less than the second brightness threshold;

determining that a ratio of a foreground area to an effective area of the acquired image is less than or equal to a set value, where the foreground area represents the area of a foreground portion of the image recognized from the acquired image, and the effective area is predetermined and is less than or equal to the area of the acquired image; and in response to the number of outlines in the acquired image being greater than or equal to a set number, determining that the image acquisition device is in an unblocked state, where the number of outlines is the number of target outlines obtained by performing outline detection on the acquired image.

In one implementation, the effective area of the acquired image is predetermined according to relative positions of the image acquisition device and a fill light, and the fill light is configured to supplement light for a region on which image acquisition is performed by the image acquisition device.

In one implementation, the first processing module 301 is further configured to issue, if it is determined that the image acquisition device is in the blocked state, alarming information in response to a duration in which the image acquisition device is continuously in the blocked state being greater than a fifth set duration.

In one implementation, the first processing module 301 is further configured to stop issuing the alarming information after issuing the alarming information and upon determining that the image acquisition device is in the unblocked state.

In one implementation, the image acquisition device is a vehicle-mounted image acquisition device, which is mounted on a vehicle and is configured to at least acquire an image of a driving position region of the vehicle; and the obtaining module 300 is configured to obtain an image acquired by the vehicle-mounted image acquisition device when the vehicle is in a started state.

In one implementation, the vehicle being in the started state includes that the traveling speed of the vehicle is greater than a set speed.

In one implementation, the image acquisition device is an infrared camera.

In practical application, both the obtaining module 300 and the first processing module 301 may be implemented by a processor in an electronic device, and the processor may be at least one of an ASIC, a DSP, a DSPD, a PLD, an FPGA, a CPU, a controller, a microcontroller, or a microprocessor.

In addition, functional modules in the embodiments may be integrated into one processing unit, or each of the units may physically exist independently, or two or more units may be integrated into one unit. The integrated unit may be implemented in the form of hardware, or may also be implemented in the form of a software functional module.

If the integrated unit is implemented in the form of a software functional module but is not sold or used as an independent product, the integrated unit may be stored in one computer readable storage medium. Based on such an understanding, the technical solutions in the embodiments or a part thereof contributing to the prior art or all or a part of the technical solutions may be essentially embodied in the form of a software product. The computer software product is stored in one storage medium and includes several instructions so that one computer device (which may be a personal computer, a server, a network device, or the like) or a processor implements all or some of the steps of the method according to the embodiments. Moreover, the foregoing storage medium includes: various media capable of storing program codes, such as a USB flash drive, a mobile hard disk drive, a Read Only Memory (ROM), a Random Access Memory (RAM), a floppy disk, and an optical disc.

Specifically, computer program instructions corresponding to the method for detecting a blocking state of an image acquisition device in the embodiments may be stored in a storage medium, such as an optical disc, a hard disk, and a USB flash drive. When the computer program instructions, corresponding to the method for detecting a blocking state of an image acquisition device, in the storage medium are read or executed by one electronic device, the method for detecting a blocking state of an image acquisition device according to any one of the foregoing embodiments is implemented.

Figure 4:
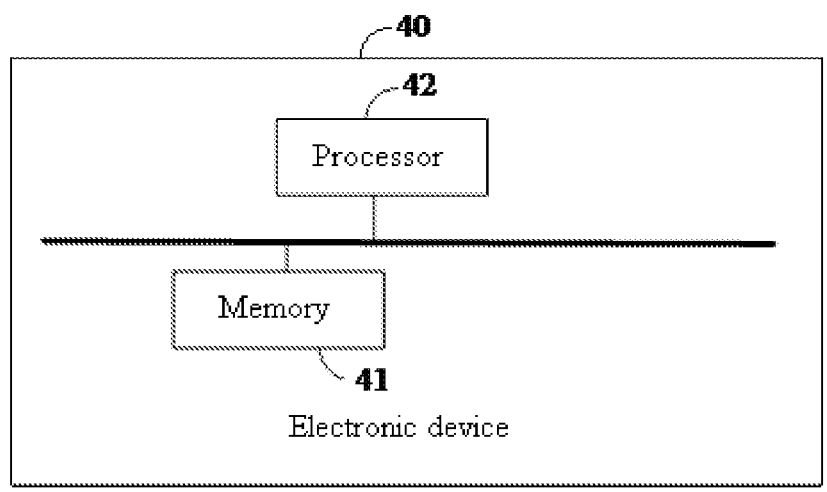
FIG. 4 is a schematic structural diagram of an electronic device according to embodiments of the present disclosure.

Based on the technical concept the same as that in the foregoing embodiments, with reference to FIG. 4, an electronic device 40 provided by the embodiments of the present disclosure is shown, and may include a memory 41 and a processor 42, where the memory 41 is configured to store a computer program and data, and the processor 42 is configured to execute the computer program stored in the memory to implement the method for detecting a blocking state of an image acquisition device according to any one of the foregoing embodiments.

In practical application, the foregoing memory 41 may be a volatile memory such as an RAM or a non-volatile memory such as an ROM, a flash memory, a Hard Disk Drive (HDD) or a Solid-State Drive (SSD), or a combination of the foregoing memories, and provides instructions and data for the processor 42.

The foregoing processor 42 may be at least one of an ASIC, a DSP, a DSPD, a PLD, an FPGA, a CPU, a controller, a microcontroller, or a microprocessor. It can be understood that for different devices, there may also be other electronic devices configured to implement the function of the foregoing processor, and no specific limitation is made thereto in the embodiments of the present disclosure.

The embodiments of the present disclosure further provide a computer storage medium, having a computer program stored thereon. When the computer program is executed by a processor, the method for detecting a blocking state of an image acquisition device according to any one of the foregoing provided in the embodiments of the present disclosure is implemented.

The embodiments of the present disclosure further provide a computer program product, where the computer program product includes computer executable instructions, and when the computer executable instructions are executed, the method for detecting a blocking state of an image acquisition device according to any one of the foregoing provided in the embodiments of the present disclosure can be implemented.

In some embodiments, functions provided by or modules included in the apparatus provided in the embodiments of the present disclosure may be configured to implement the method described in the foregoing method embodiments. For specific implementations thereof, reference may be made to descriptions of the foregoing method embodiments. For brevity, details are not described herein again.

The descriptions of the embodiments above trend to emphasize differences between the embodiments, and for the same or similar parts in the embodiments, reference may be made to these embodiments. For brevity, details are not described herein again.

The methods disclosed in the method embodiments provided by the present application may be arbitrarily combined in the case of no conflicts so as to obtain a new method embodiment.

The features disclosed in the product embodiments provided by the present application may be arbitrarily combined in the case of no conflicts so as to obtain a new product embodiment.

The features disclosed in the method or device embodiments provided by the present application may be arbitrarily combined in the case of no conflicts so as to obtain a new method or device embodiment.

By means of the description of the foregoing implementations, a person skilled in the art can clearly know that the method according to the foregoing embodiments can be implemented by software and a necessary general-purpose hardware platform, and can also be implemented by hardware, but in many cases, the former is a better implementation. Based on such an understanding, the technical solutions of the present disclosure or a part thereof contributing to the prior art may be essentially embodied in the form of a software product. The computer software product is stored in one storage medium (such as a ROM/RAM, a floppy disk, or an optical disc) and includes several instructions so that one terminal (which may be a mobile phone, a computer, a server, a conditioner, a network device, or the like) implements the method according to the embodiments of the present disclosure.

The embodiments of the present disclosure are described above with reference to the accompanying drawings, but the present disclosure is not limited to the foregoing detailed description. The foregoing detailed description is only schematic but not restrictive. Under the motivation of the present disclosure, a person skilled in the art may make many forms without departing from the purpose of the present disclosure and the scopes of protection of the claims, and these all fall within the scope of protection of the present disclosure.

The invention claimed is:

1. A method for detecting a blocking state of an image acquisition device, comprising:
   obtaining an image acquired by an image acquisition device; and
   determining, according to the acquired image, whether the image acquisition device is in a blocked state, the determining comprises:
      determining average brightness of the acquired image according to the acquired image;
      in response to the average brightness of the acquired image is greater than or equal to a first brightness threshold and is less than or equal to a second brightness threshold, the first brightness threshold being less than the second brightness threshold, determining a ratio of a foreground area to an effective area of the acquired image, wherein the foreground area represents an area of a foreground portion of an image recognized from the acquired image, and the effective area is predetermined and is less than or equal to an area of the acquired image;
      in response to the ratio of the foreground area to the effective area of the acquired image is less than or equal to a set value, determining a number of outlines in the acquired image, wherein the number of outlines is a number of target outlines obtained by performing outline detection on the acquired image;
      in response to a duration in which the number of outlines in the acquired image is less than a set number, the duration being greater than or equal to a first set duration, determining that the image acquisition device is in the blocked state, and
      in response to the number of outlines in the acquired image being greater than or equal to the set number, determining that the image acquisition device is in an unblocked state.

2. The method according to claim 1, wherein determining, according to the acquired image, whether the image acquisition device is in the blocked state further comprises:
   in response to a duration in which the average brightness of the acquired image is less than the first brightness threshold, the duration being greater than or equal to a second set duration, or a duration in which the average brightness of the acquired image is greater than the second brightness threshold, the duration being greater than or equal to a second set duration, determining that the image acquisition device is in the blocked state.

3. The method according to claim 1, wherein determining, according to the acquired image, whether the image acquisition device is in the blocked state further comprises:
   in response to a duration in which the ratio of the foreground area to the effective area of the acquired image is greater than the set value, the duration being greater than or equal to a third set duration, determining that the image acquisition device is in the blocked state.

4. The method according to claim 3, wherein the effective area of the acquired image is predetermined according to relative positions of the image acquisition device and a fill light, and the fill light is configured to supplement light for a region on which image acquisition is performed by the image acquisition device.

5. The method according to claim 1, wherein the effective area of the acquired image is predetermined according to relative positions of the image acquisition device and a fill light, and the fill light is configured to supplement light for a region on which image acquisition is performed by the image acquisition device.

6. The method according to claim 1, wherein in a case that it is determined that the image acquisition device is in the blocked state, the method further comprises:
   in response to a duration in which the image acquisition device is continuously in the blocked state, the duration being greater than a fifth set duration, issuing alarming information.

7. The method according to claim 6, wherein after issuing the alarming information, the method further comprises:
   upon determining that the image acquisition device is in the unblocked state, stopping issuing the alarming information.

8. The method according to claim 1, wherein the image acquisition device is a vehicle-mounted image acquisition device, which is mounted on a vehicle and is configured to at least acquire an image of a driving position region of the vehicle; and
   obtaining the image acquired by the image acquisition device comprises:
   obtaining an image acquired by the vehicle-mounted image acquisition device when the vehicle is in a started state.

9. The method according to claim 8, wherein the vehicle being in the started state comprises that a traveling speed of the vehicle is greater than a set speed.

10. The method according to claim 1, wherein the image acquisition device is an infrared camera.

11. An electronic device, comprising:
   a processor; and
   a memory, configured to store a computer program that, when executed by the processor, causes the processor to perform the following operations including:
   obtaining an image acquired by an image acquisition device; and
   determining, according to the acquired image, whether the image acquisition device is in a blocked state, the determining comprises:
      determining average brightness of the acquired image according to the acquired image;
      in response to the average brightness of the acquired image is greater than or equal to a first brightness threshold and is less than or equal to a second brightness threshold, the first brightness threshold being less than the second brightness threshold, determining a ratio of a foreground area to an effective area of the acquired image, wherein the foreground area represents an area of a foreground portion of an image recognized from the acquired image, and the effective area is predetermined and is less than or equal to an area of the acquired image;
      in response to the ratio of the foreground area to the effective area of the acquired image is less than or equal to a set value, determining a number of outlines in the acquired image, wherein the number of outlines is a number of target outlines obtained by performing outline detection on the acquired image;

in response to a duration in which the number of outlines in the acquired image is less than a set number, the duration being greater than or equal to a first set duration, determining that the image acquisition device is in the blocked state, and in response to the number of outlines in the acquired image being greater than or equal to the set number, determining that the image acquisition device is in an unblocked state.

12. The electronic device according to claim 11, wherein the processor is further configured for:

in response to a duration in which the average brightness of the acquired image is less than the first brightness threshold, the duration being greater than or equal to a second set duration, or a duration in which the average brightness of the acquired image is greater than the second brightness threshold, the duration being greater than or equal to a second set duration, determining that the image acquisition device is in the blocked state.

13. The electronic device according to claim 11, wherein the processor is further configured for:

in response to a duration in which the ratio of the foreground area to the effective area of the acquired image is greater than the set value, the duration being greater than or equal to a third set duration, determining that the image acquisition device is in the blocked state.

14. The electronic device according to claim 13, wherein the effective area of the acquired image is predetermined according to relative positions of the image acquisition device and a fill light, and the fill light is configured to supplement light for a region on which image acquisition is performed by the image acquisition device.

15. A non-transitory computer-readable storage medium, having stored thereon a computer program that, when executed by a processor, causes the processor to perform a method for detecting a blocking state of an image acquisition device, the method comprising:

obtaining an image acquired by an image acquisition device; and determining, according to the acquired image, whether the image acquisition device is in a blocked state, the determining comprises:

determining average brightness of the acquired image according to the acquired image;

in response to the average brightness of the acquired image is greater than or equal to a first brightness threshold and is less than or equal to a second brightness threshold, the first brightness threshold being less than the second brightness threshold, determining a ratio of a foreground area to an effective area of the acquired image, wherein the foreground area represents an area of a foreground portion of an image recognized from the acquired image, and the effective area is predetermined and is less than or equal to an area of the acquired image;

in response to the ratio of the foreground area to the effective area of the acquired image is less than or equal to a set value, determining a number of outlines in the acquired image, wherein the number of outlines is a number of target outlines obtained by performing outline detection on the acquired image;

in response to a duration in which the number of outlines in the acquired image is less than a set number, the duration being greater than or equal to a first set duration, determining that the image acquisition device is in the blocked state, and in response to the number of outlines in the acquired image being greater than or equal to the set number, determining that the image acquisition device is in an unblocked state.

\* \* \* \* \*